Figure 1:
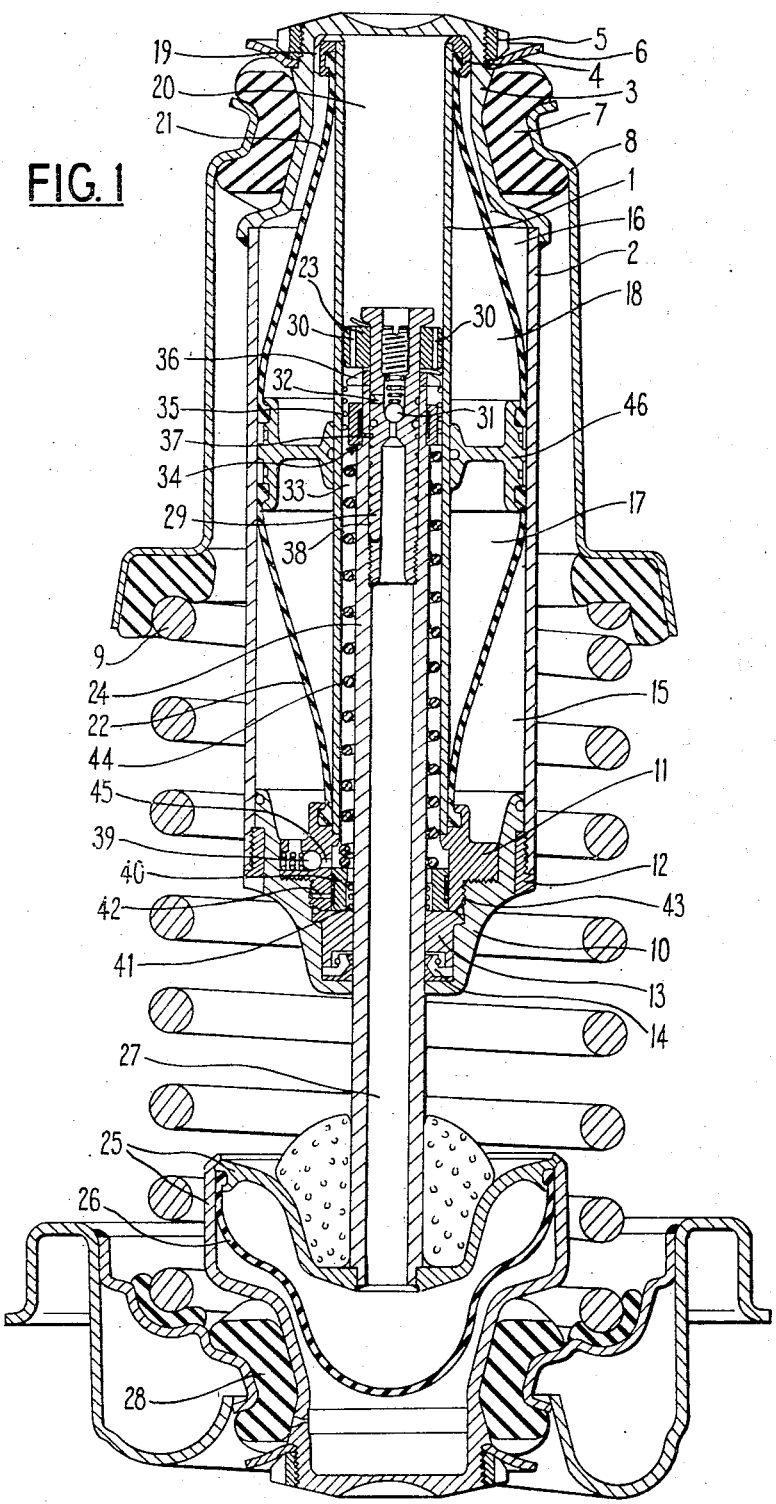

United States Patent

[11] 3,554,524

| [72] | Inventor | Wilhelm Riehl<br>Rauhnheim-Am-Main, Germany |
|---|---|---|
| [21] | Appl. No. | 755,417 |
| [22] | Filed | Aug. 26, 1968 |
| [45] | Patented | Jan. 12, 1971 |
| [73] | Assignee | General Motors Corporation<br>Detroit, Mich.<br>a corporation of Delaware |
| [32] | Priority | Sept. 6, 1967 |
| [33] | | Germany |
| [31] | | No. 1,630,886 |

[54] HYDROPNEUMATIC SUSPENSION AND DAMPING DEVICES HAVING LEVEL REGULATION FOR USE IN MOTOR VEHICLES
2 Claims, 2 Drawing Figs.

[52] U.S. Cl. .................................................... 267/64,
188/88.5
[51] Int. Cl. ..................................................... B60g 11/28
[50] Field of Search ........................................... 267/64,
65; 188/88.501, 505

[56] References Cited
UNITED STATES PATENTS
| 3,389,903 | 6/1968 | Schmid .......................... | 267/64 |
| 3,461,991 | 8/1969 | Arendarski .................... | 188/88(505) |

*Primary Examiner*—James B. Marbert
*Attorneys*—W. E. Finken and J. C. Evans

ABSTRACT: A hydropneumatic suspension and damping device having level regulation, for use in a motor vehicle, includes a damper piston by means of which, when the vehicle is in motion, fluid is pumped from a low-pressure reservoir by way of a damper space to a high-pressure reservoir. Subsequently, with the vehicle standing and being either loaded or unloaded, the damper piston is returned to midposition by the transfer of fluid through transfer apertures controlled by a pair of slide valves which surround a piston rod for the damper piston and are disposed in the region of the ends of the damper space.

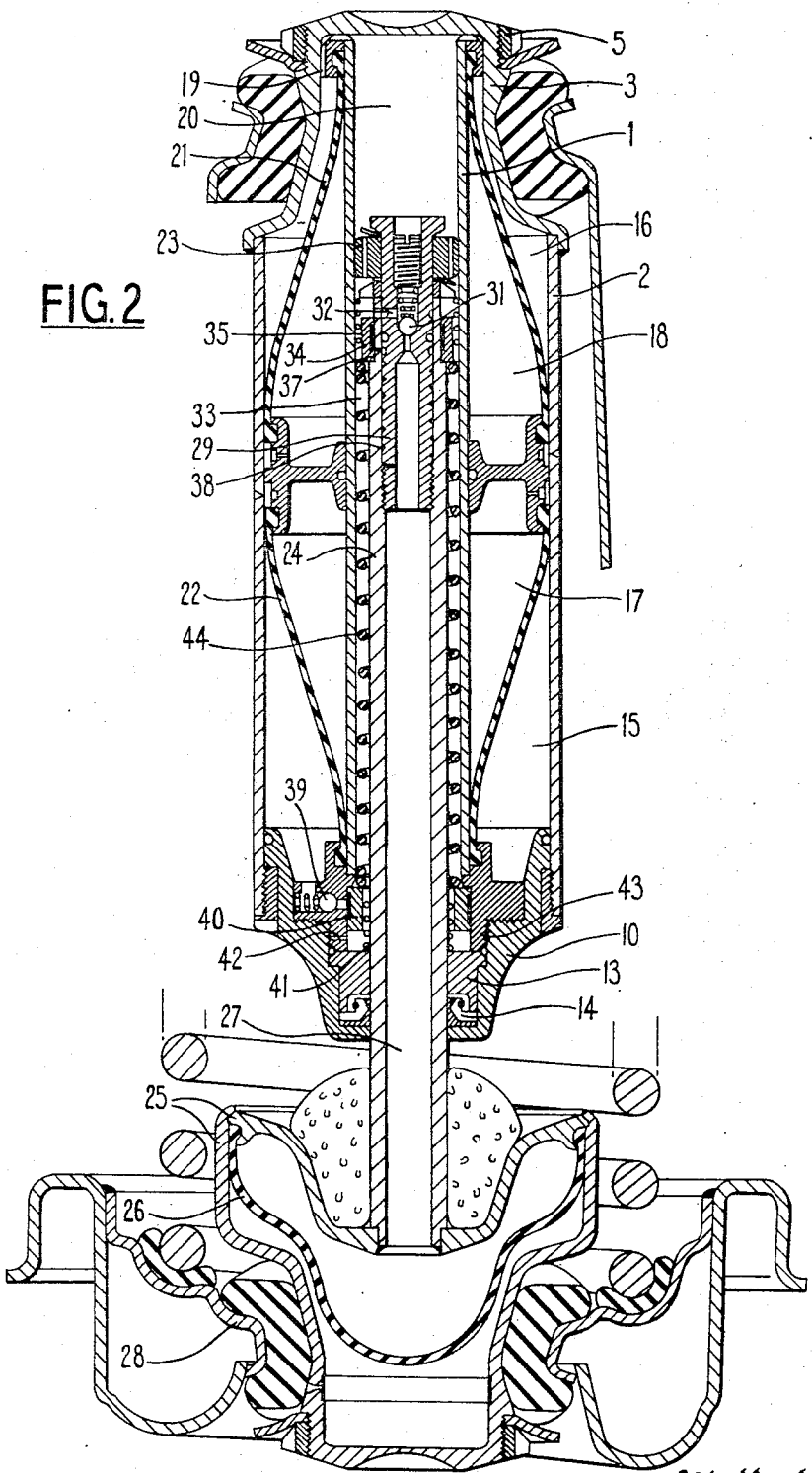

3,554,524

HYDROPNEUMATIC SUSPENSION AND DAMPING DEVICES HAVING LEVEL REGULATION FOR USE IN MOTOR VEHICLES

This invention relates to hydropneumatic suspension and damping devices having level regulation, for use in motor vehicles.

In a hydropneumatic suspension and damping device according to the invention, a damper piston is reciprocable within a damper tube by means of a piston rod to pump fluid from a low-pressure reservoir surrounding the damper tube, via a damper space between the damper tube and the piston rod, and into a high-pressure reservoir surrounding the damper tube, and the damper piston is arranged to be subsequently returned to a midposition by the transfer of fluid through transfer apertures controlled by a pair of slide valves which concentrically surround the piston rod and are disposed in the region of the ends of the damper space.

The appended claims define the scope of the invention claimed. The invention and how it can be performed are hereinafter particularly described with reference to the accompanying drawings, in which:

FIG. 1 is a fragmentary longitudinal section of one embodiment of a hydropneumatic suspension and damping device according to the invention, for use in a motor vehicle, showing a damper piston of the device in a midposition; and FIG. 2 is a fragmentary longitudinal section similar to FIG. 1, but showing the damper piston of the device in a position corresponding to a loaded vehicle condition.

In the embodiment of the hydropneumatic suspension and damping device according to the invention which is shown in the drawings, a damper tube 1 is surrounded by an outer tube 2. The damper tube 1 and the outer tube 2 are mechanically interconnected at their upper ends by a caplike portion 3, with the interposition of an annular portion 4. A threaded ring 5 is screwed on the the cap-shaped portion 3 and firmly clamps a flange 6 constituting a securing means for a rubber ring 7 which is arranged between the caplike portion 3, i.e. part of the suspension system, and a part of a vehicle body 8. The vehicle body 8 also forms an abutment for a helical spring 9 concentrically surrounding the suspension arrangement. At its lower end, the outer tube 2 is connected to the damper tube 1 via a cap-shaped portion 10, and an annular portion 11 pressed into the portion 10. The connection is established in such a way that a threaded portion 12 which is screwed into the outer tube 2 and is situated above the cap-shaped portion 10, forces the annular portion 11 against the damper tube 1. The caplike portion 10 is also provided with a ring 13 which acts upon a high-pressure packing 14.

An annular space formed between the damper tube 1 and the outer tube 2 is subdivided into a high-pressure fluid reservoir 15 and a regulating space 16, corresponding to an operating gas spring 17 and a regulating gas spring 18. The annular portion 4 is provided with passages 19 through which the regulating space 16 is in communication with the upper portion of a space 20 within the damper tube 1. A diaphragm 21 sealingly secured in the annular portion 4 and in a central annular portion 46 separates the regulating space 16 from the regulating gas spring 18; similarly, a diaphragm 22 separates the high-pressure reservoir 15 from the operating gas spring 17.

The damper tube 1 contains a damper piston 23 which is in communication with a hollow piston rod 24 for the damper piston, the bottom end of the hollow piston rod being in communication with a cavity in a cap 25, the cap 25 containing a diaphragm 26 which closes off the low-pressure reservoir 27 in the downward direction. Via a rubber member 28 of annular shape, the cap-shaped portion 25 is connected to a part of the vehicle axle (not shown in detail), on which the helical spring 9 is seated.

Screwed into the hollow piston rod 24 is a threaded part 29 which projects from the upper part of the piston rod to support the damper piston 23. The damper piston includes conventional through-flow apertures 30. The threaded part 29 contains a nonreturn valve 31 arranged to shut off fluid flow from the low-pressure reservoir 27. A bore 32 establishes a connection between the nonreturn valve 31 and an annular damper space 33 between the damper tube 1 and the piston rod 24.

An upper end portion of the piston rod 24 has a relatively small diameter, and forms a guide for a slide valve 34. This slide valve 34 is subject to the action of a spring 35 which at its other end is seated on a portion 36. The slide valve 34 is able to execute relative axial movement with respect to the piston rod 24: depending on its position, the valve closes either the bore 32 or a smaller bore 37 which is in communication with the low-pressure reservoir 27, via a groove 38 between the piston rod 24 and the threaded part 29.

Located in the annular portion 11 is a nonreturn valve 39 which is arranged in a transfer aperture 45 between the high-pressure reservoir 15 and the damper space 33. This transfer aperture 45 can be closed by means of a slide valve 40 which is under the action of a spring 41 and is also able to close a small bore 42 which, via a flat screw thread groove 43, establishes a connection between the high-pressure reservoir 15 and the damper space 33. Arranged between slide valve 40 and the slide valve 34 is a damping spring 44 which acts in opposition to the springs 35 and 41 of the valves 34 and 40. The piston rod 24 is sealingly guided through the high-pressure packing 14 in the cap-shaped portion 10.

The operation of the device is as follows: In FIG. 1 the piston is equalize in its midposition. When the vehicle is in operation, the piston 23 undergoes reciprocatory movement. During axially outward movement of the piston 23, i.e. when it moves downwards, fluid is delivered from the damper space 33 via the nonreturn valve 39 into the high-pressure reservoir 15, if the pressure there is sufficiently low. During axially inward movement of the piston 23, i.e. when it moves upwards, fluid is drawn from the low-pressure reservoir 27 via the nonreturn valve 31 into the damper space 33, because the volume of this space is increasing. During subsequent axially outward movement of the piston 23, fluid passes out of the damper space 33 into the high-pressure reservoir 15. This alternating pumping action progresses rapidly at first, but becomes increasingly slow towards the end, because the relative speed of the piston 23 needs to increase if it is to equalize the pressure differences.

If the vehicle is loaded whilst it is standing, the piston 23 plunges deeper into the damper tube 1. At the same time the damping spring 44 is relaxed until the spring 41 is able to shift the slide valve 40 upwards, so that it closes the aperture 45 to the nonreturn valve 39 and thereby opens the small aperture 42, this being the position indicated in FIG. 2. Fluid then travels very slowly through the channel 43 from the high-pressure reservoir 15 into the damper space 33, so that the piston 23 moves back into the midposition. The damper spring is thereby tensioned somewhat, with the result that the slide valve 40 is brought back into its initial position in which it closes off the aperture 42. During the next journey with the vehicle under any load, fluid is pumped over again from the low-pressure reservoir 27 into the high-pressure reservoir 15, in the manner already described.

If the vehicle is unloaded whilst it is standing, the piston 23 travels axially outwards beyond the midposition, i.e. with reference to the drawing it moves downwards. At the same time the damper spring 44 is tensioned so that it overcomes the force of the spring 35 of the slide valve 34, whereby the slide valve 34 is moved upwards so that the aperture 32 to the nonreturn valve 31 is closed. The small aperture 37 is opened, and fluid flows from the damper space 33, via the aperture 37 and the channel 38, into the low-pressure reservoir 27. The piston 23 again moves upwards towards the midposition until the spring 35 moves the slide valve 34 downwards again, so closing the aperture 37. During the next journey with the vehicle under any load fluid is pumped over again in the manner already described.

The apertures 42 or 37 are thus in communication with the high-pressure or low-pressure reservoir, as the case may be, via a flat threaded groove of appropriate length in order to attain a sufficient time delay in the upward or downward regulating action. During repeated loading and unloading with the vehicle standing, equal pressures finally become established in the high-pressure reservoir 15, in the damper space 33, and in the low-pressure reservoir 27. The midposition of the piston will then correspond approximately to half-load.

I claim:

1. In a hydraulic pneumatic suspension and damping device for leveling a vehicle the combination comprising; means adapted to be connected to a sprung mass, means adapted to be connected to an unsprung mass; and elongated hollow piston rod having one end connected to one of said means and the opposite end connected to a piston; means defining a low-pressure hydraulic reservoir in direct communication with the interior of said hollow piston rod, a damper tube located in spaced surrounding telescoping relationship with said piston rod and supportingly receiving said piston for reciprocation therein, means defining a first gas spring in surrounding relationship to said damper tube, means defining a hydraulic fluid regulating space around said first gas spring in communication with said damper tube at one end of said piston; flow through apertures in said piston communicating said damper tube on opposite ends of said piston; means including said piston rod for defining a damper space therebetween; means for defining a second gas spring aground said damper tube; means defining a high-pressure reservoir for hydraulic fluid around said second gas spring, first one way check valve means communicating said damper space with said high-pressure reservoir; first aperture means defining a restricted fluid path between said high-pressure reservoir and said damper space; a first slide valve concentrically disposed around said piston rod at one end thereof; a first control spring for biasing said first slide valve in a direction to close said one way check valve means and to open said aperture means; a damping control spring surrounding said piston rod having one end thereof supported on said first slide valve for moving it in opposition to the biasing action of said first control spring; means including a second one way check valve and a bore for communicating said low-pressure reservoir with said damper space for drawing hydraulic fluid from said low-pressure reservoir into said damper space during normal road movements when said piston is in a predetermined midposition within said damper tube wherein the sprung and unsprung masses are at a desired height relationship; a second slide valve concentrically disposed around said piston rod adjacent said piston; means on said second valve in engagement with the opposite end of said damping control spring; second aperture means through said piston rod communicating said low-pressure reservoir with said damper space normally closed by said second slide valve when the sprung and unsprung masses are at a desired height relationship; a second control spring in engagement with said second slide valve and operative in response to unloading of the vehicle to cause said second slide valve to be shifted by said damping control spring in a direction to block unrestricted flow through said bore between said damper space and said low-pressure reservoir and to open said second aperture means for causing flow of hydraulic fluid into said low-pressure reservoir to return said piston to the midposition; said first slide valve control spring and said damping control spring cooperating when the vehicle is loaded to cause said first slide valve to move to close said first one way check valve and to communicate said damper space with said high-pressure space through said first aperture means for slowly bleeding hydraulic fluid from said high-pressure reservoir into said damper space, across said damper piston and into said hydraulic fluid regulating space to cause the pressure on said damper piston to shift to return it to the midposition within said damper tube.

2. In the combination of claim 1, said first and second slide valve control springs each acting in opposition to said damping control spring, said bore and said second aperture means being spaced apart an axial distance less than the length of said second slide valve, said first control aperture means and said first one way check valve being spaced apart an axial distance along said piston rod less than the axial length of said first slide valve, said spring rates of said slide valve control springs and that of said damping spring being operative in response to inward or outward movement of said damper piston on either side of its midposition in said damper tube to cause the damping spring to release one of said slide valves for control movement by its spring while displacing the other slide valve in opposition to the action of its control spring.